United States Patent [19]

Sako et al.

[11] Patent Number: 4,972,417
[45] Date of Patent: Nov. 20, 1990

[54] PCM DATA TRANSMITTING APPARATUS AND METHOD

[75] Inventors: Yoichiro Sako, Chiba; Kentaro Odaka, Tokyo, both of Japan

[73] Assignee: Sony Corporation, Tokyo, Japan

[21] Appl. No.: 366,751

[22] Filed: Jun. 15, 1989

Related U.S. Application Data

[63] Continuation-in-part of Ser. No. 337,617, Apr. 13, 1989.

[30] Foreign Application Priority Data

Jun. 24, 1988 [JP] Japan .................. 63-156566

[51] Int. Cl.⁵ .................................... G06F 11/10
[52] U.S. Cl. .................... 371/37.4; 371/37.1; 371/37.7; 371/40.1; 371/41
[58] Field of Search ............... 371/37.4, 37.5, 37.6, 371/38.1, 39.1, 40.1, 40.3, 41, 37.1, 2.1, 2.2, 50.1, 37.7; 360/48, 53

[56] References Cited

U.S. PATENT DOCUMENTS

| | | | |
|---|---|---|---|
| 4,320,511 | 3/1982 | Koga | 371/37.1 |
| 4,500,926 | 2/1985 | Yoshimaru | 371/37.1 X |
| 4,542,419 | 9/1985 | Morio et al. | |
| 4,688,225 | 8/1987 | Fukami et al. | |
| 4,758,907 | 7/1988 | Okamoto et al. | |

Primary Examiner—Jerry Smith
Assistant Examiner—Robert W. Beausoliel
Attorney, Agent, or Firm—Philip M. Shaw, Jr.

[57] ABSTRACT

A data transmission and reception apparatus and method capable of selecting either of two modes having the same sampling frequency in which the bit number of one data unit are either m or n (which are integral numbers and m>n), while using the same error correction encoder and decoder for the two modes, by inserting m-n bits of dummy data bits into the n-bit data so as to handle it as m-bit data during the processes of error correction encoding and decoding and eliminating from the error correction encoded data the dummy data and a redundant code of the error correction code formed by the dummy data so that the data transmission rate can be lowered.

23 Claims, 11 Drawing Sheets

NTSC (12 BITS) ··· B-MODE

CCIR (12 BITS) ··· B-MODE

NTSC (16 BITS)··· A-MODE

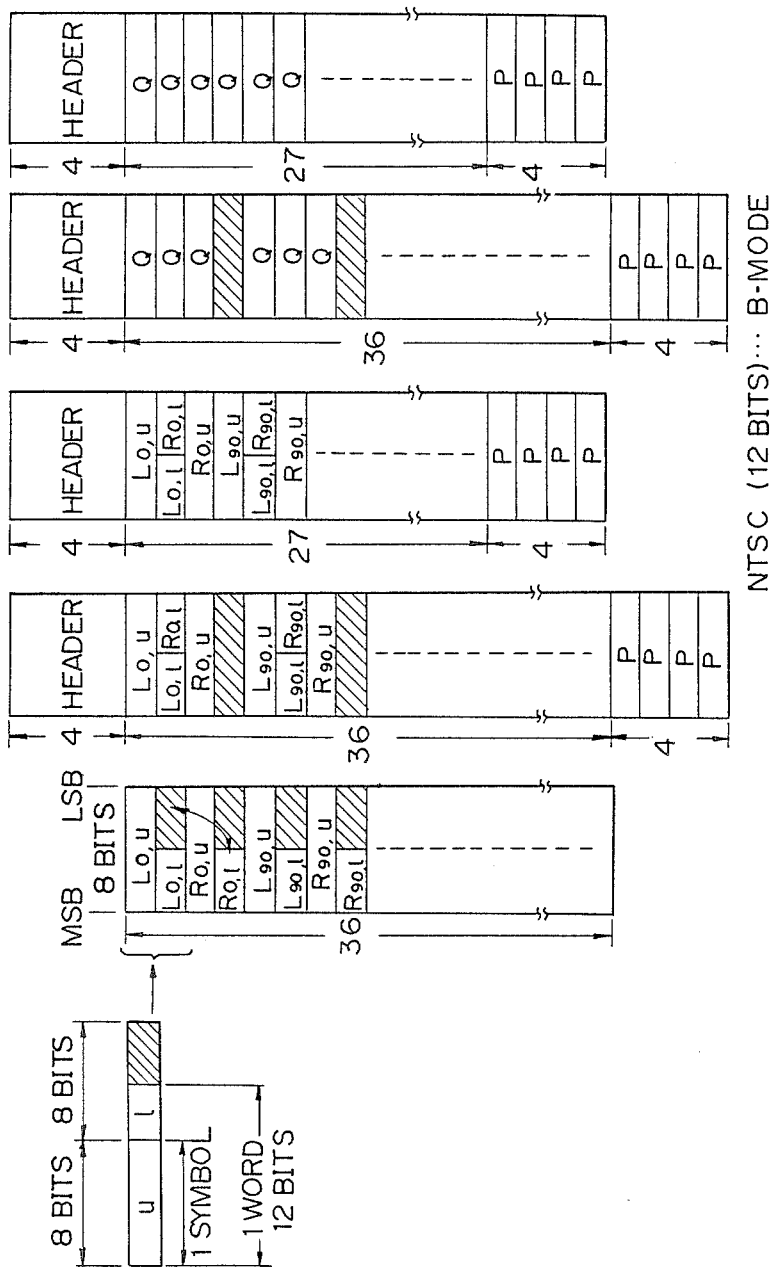

NTSC — B-MODE

NTSC (16 BITS) — A-MODE

PCM DATA TRANSMITTING APPARATUS AND METHOD

CROSS-REFERENCE TO RELATED APPLICATION

This application is a continuation-in-part of our co-pending application Ser. No. 337,617, entitled DATA TRANSMISSION AND RECEPTION APPARATUS AND METHOD, filed Apr. 13, 1989, and assigned to the same assignee of the present application.

BACKGROUND OF THE INVENTION

1. Field of the Invention

The invention relates to a data transmission apparatus applied to the recording of a digital audio signal.

2. Description of the Prior Art

As one apparatus for recording/reproducing a digital audio signal, there is a known VTR (8-mm VTR) which divides one track scanned by a rotational head into a recording section for a video signal and a recording section for a digital audio signal and records a video signal of one field and a time-compressed digital audio signal of one field in the two recording sections, respectively. In the 8-mm VTR, the system by which an analog audio signal is FM modulated and recorded by the superimposition on a video signal is called a "standard recording system", and as an option, a recording format of the above-stated audio signal is standardized. Such an apparatus for recording a digital audio signal is disclosed in the U.S. Pat. No. 4,542,419.

In a digital audio signal of an 8-mm VTR, the sampling frequency is to have 2 fh (fh: horizontal frequency), and the quantization bit number is selected to be 8 bits. These sampling frequency and the quantization bit number do not provide satisfactory values in terms of high quality audio reproduction. Consequently, it is thought that a digital audio signal having a sampling frequency of 48 kHz and a quantization bit number of 16 bits should be recorded and reproduced. In this case, one problem is that the transmission data amount increases and the recording wavelength on the magnetic tape becomes short.

Especially, in the 8-mm VTR, it is difficult to achieve an increase of the transmission data amount in every kind of magnetic tape because of the use of recording sections of short track length. Specifically, although digital audio data having the above-mentioned high quality can be recorded and reproduced using a metal evaporated tape, there is a problem that the recording/reproduction cannot be performed using a metal coating tape.

To solve this problem, it has been suggested that the bit number of one sample of a digital audio signal could be changed depending on the kind of magnetic tape to be used. For example, an analog audio signal could be digitized with a quantization bit number of 16 bits. Compression processing of this digitized audio signal is not carried out in the case where metal evaporation tape is used for recording and reproduction, while 16-bit-to-12-bit compression is done in the case where the metal power coating tape is used. Therefore, when such a signal compression is done, the number of samples contained in one field of NTSC system or CCIR system becomes a predetermined number to enable the bit number of one sample to be compressed, thereby lowering the data transmission rate.

To cope with an error occurring at the time of the recording/reproduction, there is a known error correcting method in which digital data contained in one field period, for example, is arranged in two-dimensional form, and encoding using error correction codes is performed in the first direction and the second direction of the two-dimensional array (called a "block"). Changing the bit number of one word depending on the tape used creates the necessity of making different block sizes and requires two kinds of encoders and decoders for error correction encoding and decoding corresponding to the two kinds of bit numbers, respectively. However, because this increases the hardware size consequently, it is desired that the encoder and the decoder can be each commonly used to the greatest possible extent to cope with the two kinds of PCM audio signals.

As described in the specification of the U.S. application Ser. No. 337,617, the applicants of the present application have proposed a system in which four-bit dummy data (specifically "0" data) is added in the compression of 16 bits/word to 12 bits/word, 12-bit data is converted into pseudo-16-bit data, the sizes of blocks are made equal and the converted data is transmitted after processing at an encoder with the dummy data eliminated. In this system the encoder and decoder can each be commonly used between 12 bits and 16 bits.

Additionally, as a system in which the sizes of blocks of error correction codes are kept equal between 16-bits data and 12-bits data, the one described in the U.S. Pat. No. 4,688,225 and in the U.S. Pat. No. 4,758,907 is known. This system has been adopted in the DAT (digital audio tape recorder). However, in the case of the DAT, the bit number is reduced by ¾ from 16 bits to 12 bits, and the sampling frequency is lowered by ⅔ from 48 kHz to 32 kHz. As a result, the data amount is decreased by ½, while the relative speed between the rotational head and the magnetic tape is reduced by ½. The recording wavelength is kept equal between the 16-bits data and the 12-bits data. For this reason, as mentioned above, the DAT system described above is not applicable to the case where the recording wavelength is varied to select a most suitable recording wavelength depending on the type of magnetic tape used.

The present invention relates to an improvement of the previously proposed system where the sizes of blocks processed at an encoder of an error correction code are made equal by adding dummy data with respect to data having different bit numbers as disclosed in the U.S. application Ser. No. 337,617. In the previously proposed system, dummy data and a digital audio signal are mixed in one symbol (or word) which is a unit of the encoding. In addition, when the encoding for the error correction code is performed with respect to a block with dummy data added, both of the dummy data and the digital audio signal coexist in the set of error correction codes. Further, one error correction code is suitable for data arranged in the diagonal direction of the block, and the encoding of the other error correction code (C1 parity) is performed for a redundant code (C2 parity) of one error correction code.

Consequently, although it is possible to transmit data except for dummy data after the encoding for error correction and to finally magnetically record that data, it is impossible to exclude a redundant code caused by data including the dummy data. For this reason, the reduction of the amount of data to be transmitted is not sufficient. As a result, there is still a difficulty in the case where the compressed PCM signal of 12 bits is recorded onto metal powder tape.

OBJECTS AND SUMMARY OF THE INVENTION

An object of the present invention is to provide a data transmission apparatus and method capable of transmitting data, with the exclusion of dummy data and a part of redundant codes, after an encoding process adding an error correction code to a signal with a compressed data bit and reducing the amount of data to be transmitted.

Another object of the invention is to provide a data transmission apparatus and method capable of making equal the sizes of blocks between the NTSC system and the CCIR system, while using the same encoder and decoder for these different systems, transmitting data, with the exclusion of dummy data and a part of redundant codes as mentioned above, and reducing the amount of data to be transmitted.

A further object of the invention is to provide a data transmission apparatus and method capable of making equal the sizes of blocks despite the difference of 16-bit data and 12-bit data and the difference of the NTSC system and the CCIR system, using the same encoder and decoder, transmitting with the exclusion of dummy data and a part of redundant codes, and reducing the amount of data to be transmitted.

Accordingly the present invention of a data transmission method and apparatus for error correction encoding data in units of a block composed of a two-dimensional array of digital information signals comprises the steps, and associated apparatus for:

making equal the size of a first block and the size of a second block in the first and second blocks, whose block sizes are different, by adding dummy data to whichever block has the lesser amount of data;

adding dummy data to the smaller block so that at least a part of a sequence of the error correction code is developed only by the dummy data;

selectively supplying the one block that has the dummy data and the other block that does not contain dummy data to an encoder of the error correction code; and transmitting an output signal of the encoder from which the dummy data and a redundant code formed only by the dummy data are eliminated.

Also, in accordance with another aspect of the present invention, a data transmission method and apparatus for encoding by a first error correction code (C1 code) data disposed in the vertical direction of a block which is composed of a two-dimensional array of digital information signals and for encoding by a second error correction code (C2 code) data arranged in the horizontal direction of the block, comprises the steps, and associated apparatus for:

making equal the size of a first block and the size of a second block in the first and second blocks whose block sizes are different by adding dummy data to whichever of the blocks has the lesser amount of data, the dummy data being added so that it is arranged in the horizontal direction within the block;

selectively supplying the block containing the added dummy data and the other block that does not contain added dummy data to an encoder of the first and second error correction codes; and transmitting an output signal of the encoder from which the dummy data and a redundant code of the second error correction code formed only by the dummy data are eliminated.

In accordance with still another aspect of the present invention, a data transmission method and apparatus for encoding by a first error correction code (C1 code) data disposed in the vertical direction of a block which is composed of a two-dimensional array of digital information signals and for encoding by a second error correction code (C2 code) data arranged in the horizontal direction or in the oblique direction of the block, comprises the steps, and associated apparatus for:

making equal the size of a first block and the size of a second block in the first and second blocks whose block sizes are different by adding dummy data to whichever block has the lesser amount of data, the dummy data being added so that it is arranged in the vertical direction within the block;

selectively supplying the block containing the added dummy data and the other block that does not contain any added dummy data to an encoder of the first and second error correction codes; and transmitting an output signal of the encoder from which the dummy data and a redundant code of the first error correction code formed only by the dummy data are eliminated.

In accordance with yet another aspect of the present invention, a data transmission apparatus and method for encoding by a first error correction code (C1 code) data disposed in the vertical direction of a block which is composed of a two-dimensional array of digital information signals and for encoding by a second error correction code (C2 code) data arranged in the horizontal direction of the block, comprises the steps, and associated apparatus for:

making equal the size of a first block and the size of a second block in the first and second blocks whose block sizes are different by adding first and second dummy data to whichever of the blocks has the lesser amount of data, the first dummy data being added so that it is arranged in the vertical direction within the block and the second dummy data being added so that it is arranged in the horizontal direction within the block;

selectively supplying the block containing the added first and second dummy data and the other block which does not contain the first and second dummy data to an encoder of the first and second error correction codes; and transmitting an output signal of the encoder from which the first and second dummy data, a redundant code of the first error correction code formed only by the first and second dummy data and a redundant code of the second error correction code are eliminated.

Reed-Solomon error correction codes for the data blocks are employed for encoding by a first error correction code (C1 code) in the vertical direction of the block and for encoding by a second error correction code (C2 code) in the horizontal direction. The encoding is done at the unit of a symbol having an eight-bit length, for example. In the mode where 16-bit (1 word=2 symbols) data is compressed into 12-bit data, four-bit dummy data (zero data) is added after the compression. The upper eight bits of the 12-bit data construct one symbol, and lower four bits thereof and lower four bits of another word form a symbol. Dummy data of one symbol is added to three symbols. As a result, a symbol consisting only of the dummy data is formed.

Symbols consisting of dummy data are disposed in a block so that they are arranged in the horizontal direction of the block. Therefore, when the encoding of the C2 code is made in the horizontal direction, a redundant code of the C2 code is developed from only dummy data. No transmission of the redundant code is needed at all as is the case with the dummy data.

Also, when the sizes in the horizontal direction of the blocks are different between the NTSC system and the CCIR system, symbols consisting of dummy data are disposed in the vertical direction in a block so that the sizes of the blocks in the two television systems become equal. Consequently, when the encoding of the C1 code is performed in the vertical direction, a redundant code of the C1 code is formed only by dummy data. No transmission of the redundant code is needed as is the case with the dummy data.

Consequently, in the case of magnetically recording the PCM audio signals, the transmission of the dummy data is well as that of the redundant code formed only by the dummy data can be omitted to reduce the data transmission amount.

Further, by adding dummy data in both the horizontal direction and the vertical direction, the difference in size of the blocks caused due to the difference of 16 bits and 12 bits and due to the difference of the television systems can be corrected.

The above, and other, objects, features and advantages of the present invention will become readily apparent from the following detailed description thereof which is to be read in connection with the accompanying drawings.

BRIEF DESCRIPTION OF THE DRAWINGS

FIGS. 12A, 12B, 12C, 12D, and 12E are a schematic diagram for describing the addition of dummy data;

DETAILED DESCRIPTION OF THE PREFERRED EMBODIMENTS

Figure 1:
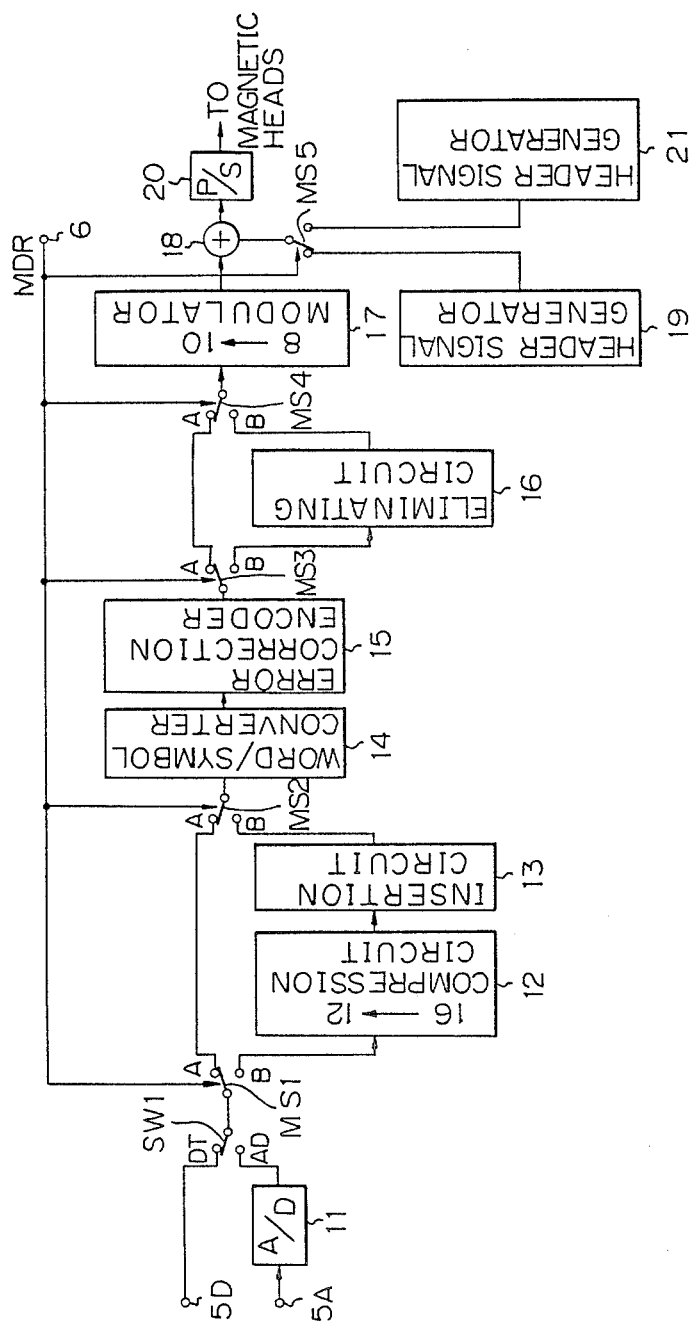
FIG. 1 is a block diagram of a recording apparatus of one embodiment of this invention.

An embodiment of the invention will be described referring to the drawings. The description will be given in the following order:

a. Recording apparatus and reproduction apparatus.
b. Two-dimensional array of data (block).
c. Addition of dummy data.
d. Modification.

a. Recording apparatus and reproduction apparatus

FIG. 1 shows a recording apparatus. In FIG. 1, MS1~MS5 indicate mode selection switches. The mode selection switches MS1~MS5 are caused to connect to the terminal A sides under the control of a mode selection signal MDR from a terminal 6 in a mode in which one word is formed by 16 bits (in this mode data is recorded onto, for instance, a metal evaporated tape and hereunder this mode is called "A mode"). When a mode in which one word has 12 bits is set (in this mode data is recorded onto, for instance, a metal powder tape and hereunder this mode is called "B mode"), the mode selection switches MS1~MS5 are connected to the terminal B sides. The mode selection signal MDR is formed by a switch manipulation made by a user depending on the tape used. The above-mentioned mode selection signal MDR can be generated automatically by deciding whether the tape is a metal evaporated tape or a metal powder coating tape by the presence or absence of a hole provided in the tape cassette.

An analog audio signal from an input terminal 5A is supplied to an A/D converter 11 and digitized by a 16-bit quantization bit number with a 48 kHz sampling frequency. The digital audio signal is fed to a terminal AD of a switch circuit SW1, and a digital audio signal obtained by a similar sampling frequency and a similar quantization bit number is supplied to a terminal DT of the switch circuit SW1 from an input terminal 5D. For instance, an input signal to the input terminal 5D could be a digital signal from a CD apparatus or an R-DAT apparatus. The output signal of the switch circuit SW1 is supplied to the mode selection switch MS1.

In the A mode, the output signal of the mode selection switch MS1 is supplied directly to the terminal A of the mode selection switch MS2. In the B mode, the output signal of the mode selection switch MS1 is supplied to a compression circuit 12 for 16-bit to 12-bit compression. A non-linear compression method can be employed. The output signal of the compression circuit 12 is supplied to a dummy-bit insertion circuit 13, and four dummy bits are inserted into time slots which occur due to the compression as will be described later. The dummy bits are zero data of binary signals, for example,. The output signal of the dummy-bit insertion circuit 13 is fed to the terminal B of the mode selection switch MS2.

The output signal of the mode selection switch MS2 is supplied to a word/symbol converter 14 for conversion into an eight-bit symbol. The output signal of the word/symbol converter 14 is supplied to an error correction encoder 15. The error correction encoder 15 performs encoding for every audio signal of one field. In the error correction encoder 15, a memory (not shown) is provided, and data of one field (original PCM audio data and dummy data are mixed together in the B mode) is stored in the memory. Encoding for an error correction code is made for every block stored in the memory. Since dummy data is added, the sizes of the blocks can be made equal in the case of 16 bits/1 word and the case of 12 bits/1 word, as will be explained in greater detail hereinafter. The common error correction encoder 15 is used for both cases. As will be mentioned later, at the error correction encoder 15, encoding for the C1 code is performed in the vertical direction of a block and encoding for the C2 code is performed in the horizontal direction of the block. In addition, Reed-Solomon codes are employed for the C1 code and C2 code. Further, the time axis of the data is compressed to, for instance, 1/6 in the error correction encoder 15.

The output signal of the error correction encoder 15 is supplied to the mode selection switch MS3. Data taken out of the terminal A side of the mode selection switch MS3 is supplied to an 8-10 modulator 17 through the terminal A side of the mode selection switch MS4. Data taken out from the terminal B side of the mode selection switch MS3 is fed to a dummy-bit elimination circuit 16 for the elimination of the dummy bits. At the dummy-bit elimination circuit 16, the added four dummy bits and a redundancy code of either the C2 or the C1 code which is composed of only added dummy bits are eliminated. As a result, the amount of 12-bit data can be reduced as compared with the 16-bit data. The output signal of the dummy-bit elimination circuit 16 is supplied to the 8-10 modulator 17 via the terminal B side of the mode selection switch MS4.

The 8-10 modulator 17 is provided for preventing a bit-error caused by a direct current (DC) component included in the recording data, and generates 10-bit data so as to reduce the DC component. The 8-10 modulator 17 generates 10-bit data by dispersing "0" and "1" of the 8-bit data. The 8-10 modulator 17 is made up of a read only memory (ROM) (not shown) storing a conversion map. The output signal of the 8-10 modulator 17 is fed to an adder 18. A 16 bit header signal from a header signal generator 19 and a 12 bit header signal from a header signal generator 21 are selectively supplied to the adder 18 through the mode selection switch MS5. The header signal is made up of a synchronization signal, an address signal, an identification signal, etc. An error correction code which will be described later can perform the encoding using the C1 code even with respect to the address signal and the identification signal of the header signal, however, in this case, these address signal and identification signal are added on the input side of the error correction encoder 15.

The output signal of the adder 18 is converted into serial data by a parallel-serial converter 20, and recorded onto a magnetic tape by a rotary head.

Figure 2:
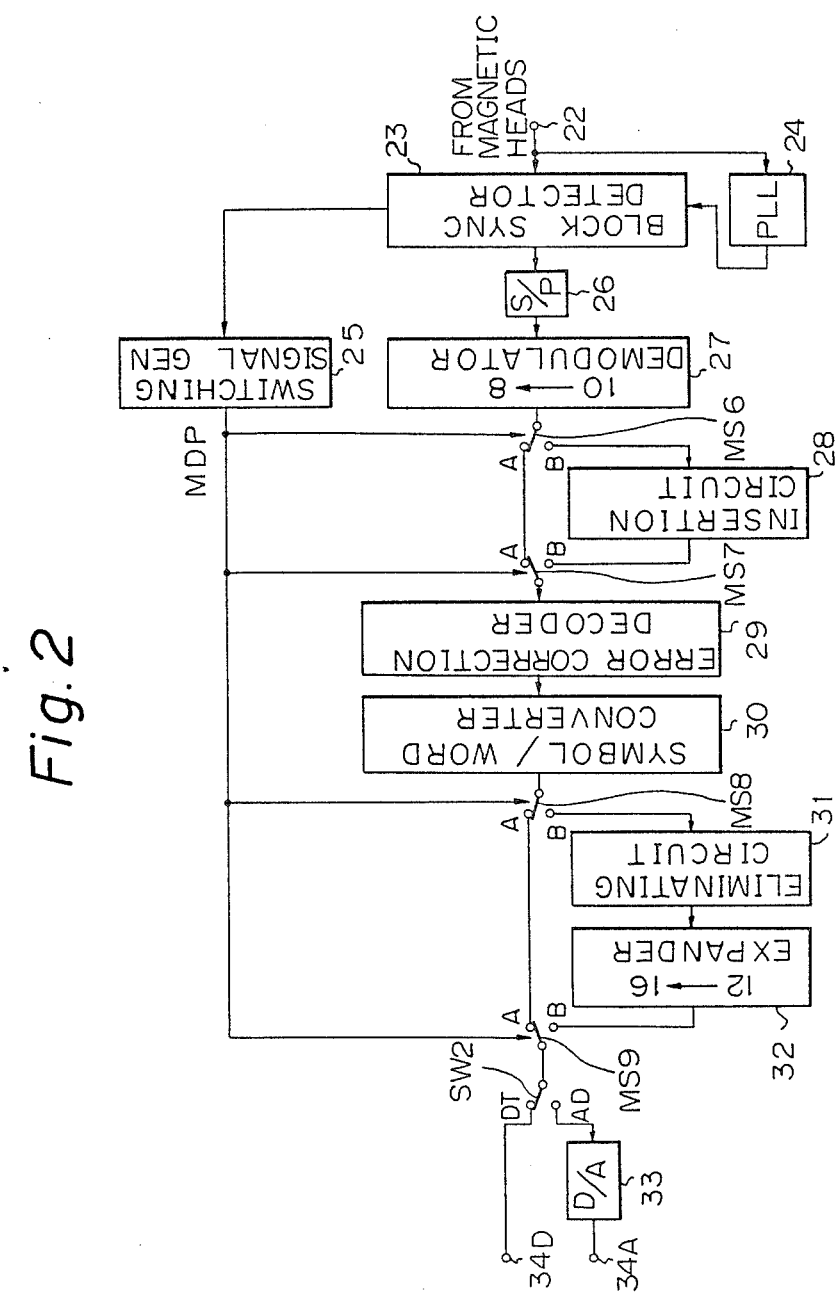
FIG. 2 is a block diagram of a reproduction apparatus of one embodiment of the invention.

FIG. 2 shows a reproduction apparatus, and in FIG. 2, MS6~MS9 indicate mode selection switches. In these mode selection switches MS6~MS9, the terminal A sides are selected in the A mode and terminal B sides are selected in the B mode under the control of a mode selection signal MDP.

Reproduction data from an input terminal 22 is supplied to a block-synchronization-signal detector 23 and a phase locked loop (PLL) circuit 24. A clock signal in synchronism with the reproduction data is developed by the PLL circuit 24, the clock signal is fed to the block-synchronization-signal detector 23, and the block synchronization signal is detected. The block synchronization signal is supplied to a switching signal generator 25. Due to a difference of the detection periods of the block synchronization signal, the mode selection signal MDP indicative of whether the reproduced data assumes the A mode or the B mode is formed by the switching signal generator 25.

The reproduction data is supplied to a serial-parallel converter 26 and converted into 10-bit parallel data. The output signal of the serial-parallel converter 26 is supplied to a 10-8 demodulator 27 so that a ten-bit to eight-bit conversion is made. The 10-8 demodulator 27 is complementary with the 8-10 modulator 17 on the recording side and is made up of a ROM (not shown) storing a data conversion map.

The output signal of the 10-8 demodulator 27 is supplied to an error correction decoder 29 through the terminal A side of the mode selection switch MS6 and the terminal A side of the mode selection switch MS7. On the other hand, in the B mode, the output signal of the 10-8 demodulator 27 is supplied to a dummy-bit insertion circuit 28 through the mode selection switch MS6. By means of the dummy bit insertion circuit 28, dummy bits are inserted in the positions in the block similar to those at the time of recording. Even in the case of 12-bit data, the size of the block is kept equal to 16-bit data. The output signal of the dummy-bit insertion circuit 28 is supplied to the error correction decoder 29 through the terminal B side of the mode selection switch MS7. One feature of the present invention is that the error correction decoder 29 is used in common with the 16-bit data and 12-bit data. The error correction decoder 29 has a memory (not shown) for storing one block of data, and the decoding of the C1 code and the C2 code is made using reproduced data read out from the memory. In addition, the time axis is expanded by a factor of six by the error correction decoder 29.

The error corrected data from the error correction decoder 29 is fed to a symbol/word converter 30 for a symbol to word conversion. In the A mode, the output signal of the symbol/word converter 30 is supplied to a switch circuit SW2 through the terminal A of the mode selection switch MS8 and the terminal A of the mode selection switch MS9. In the B mode, the output signal of the symbol/word converter 30 is supplied to a dummy-bit elimination circuit 31 through the terminal B side of the mode selection switch MS8. The output signal of the dummy-bit elimination circuit 31 is supplied to a 12-16 bits expanding circuit 32 for the expansion of one word to 16 bits. The output signal of the 12-16 bits expanding circuit 32 is supplied to the switch circuit SW2 through the terminal B of the mode selection switch MS9.

When the switch circuit SW2 is connected to the terminal DT side, a digital audio signal is taken out at an output terminal 34D. When the switch circuit SW2 is connected to the terminal AD side, an analog audio signal is taken out of an output terminal 34A.

In FIG. 2, although not shown, an interpolation circuit can be provided to the decoder 29 to interpolate a word which cannot be error-corrected using a plurality of correct words.

Figure 3:
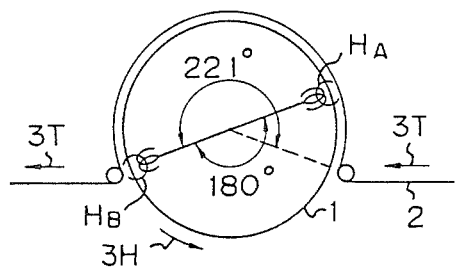
FIG. 3 is a schematic diagram showing a head arrangement of an example of a VTR to which the invention is applicable.
Figure 4:
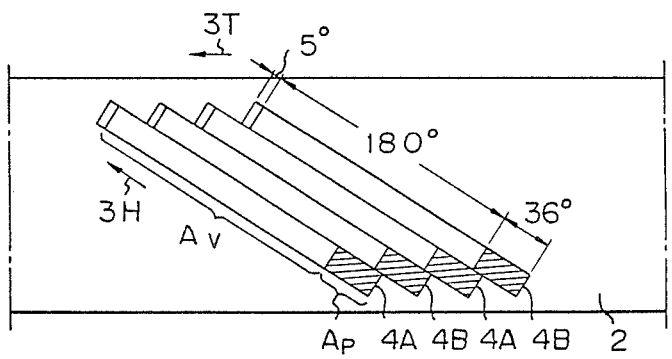
FIG. 4 and FIG. 5 are schematic diagrams of another example of track patterns to which the invention is applicable.
Figure 5:
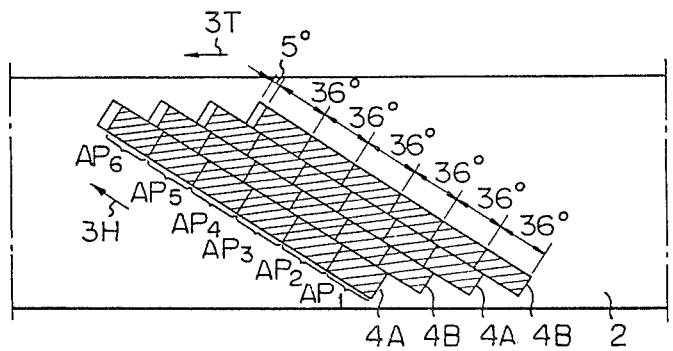

Recording data developed by the recording apparatus shown in FIG. 1 is recorded by an 8-mm VTR. FIG. 3 shows the structure of the rotary head device of the 8-mm VTR, and FIGS. 4 and 5 show tape formats. The details of this technique are disclosed in the foregoing U.S. Pat. No. 4,542,419.

In FIG. 3, HA and HB show the rotary heads, and these rotary heads HA and HB are disposed to provide different azimuth angles of their operation gaps and are disposed 180° to one another. The rotary heads HA and HB are rotated toward the direction indicated by an arrow 3H at a frame frequency. A magnetic tape 2 is run at constant speed toward the direction of an arrow 3T in a state where the magnetic tape 2 is wound around the circumference surface of a drum 1 containing the heads HA and HB in a range of an angle 221°.

Tracks 4A and 4B having a length of 221° are alternately formed on the magnetic tape 2 by the rotary heads HA and HB, as shown in FIG. 4. In an area AP having an angular range of about 36° from the point where the rotary heads HA and HB start to scan in the tracks 4A and 4B, a digital audio signal related to one field of a video signal is recorded as compressed in terms of the time axis. In a subsequent area AV having an angular range of 180°, a color video signal of one field, an FM audio signal and a pilot signal for tracking of the magnetic heads are recorded by frequency multiplexing. The remaining 5° is provided for a margin for the separation of the heads from the tape.

Also, in an 8-mm VTR, the recording area AV for the color video signal can also be used as a recording area for a PCM audio signal for the use of an 8-mm VTR as a recording/reproducing device for audio only. Specifically, since the length of the area AV having an angular range of 180° in which the color video signal is recorded, is five times as long as that of the area AP having an angular range of 36°, five areas $AP_2 \sim AP_6$ can be provided for each track 4A, 4B besides the original area $AP_1$ as shown in FIG. 5. Digital audio signals of different channels are recorded in these six areas $AP_1 \sim AP_6$.

b. Two-dimensional array of data (block)

At the error correction encoder 15 (FIG. 1), the encoding is performed with respect to each data unit consisting of the two-dimensional array of data (i.e the block). FIGS. 6A to 9 show several examples of block structures.

In the NTSC system (field frequency=59.94 Hz), two-channel (left-hand channel and right-hand channel) audio signals (1 word/16 bits) in one field period are sampled at a sampling frequency of 48 kHz. For this reason, the number of symbols (1 symbol=8 bits) of a digital audio signal in one field period becomes 3204 based on the following equation:

$$\frac{48000 \times 16 \times 2}{59.94 \times 8} = 3203.4$$

In the CCIR system (field frequency=50 Hz), since two channel audio signals in one field period are sampled at a sampling frequency of 48 kHz, the number of symbols of a digital audio signal in one field period becomes 3840 from the following equation:

$$\frac{48000 \times 16 \times 2}{50 \times 8} = 3840$$

Figures 6A, 6B:
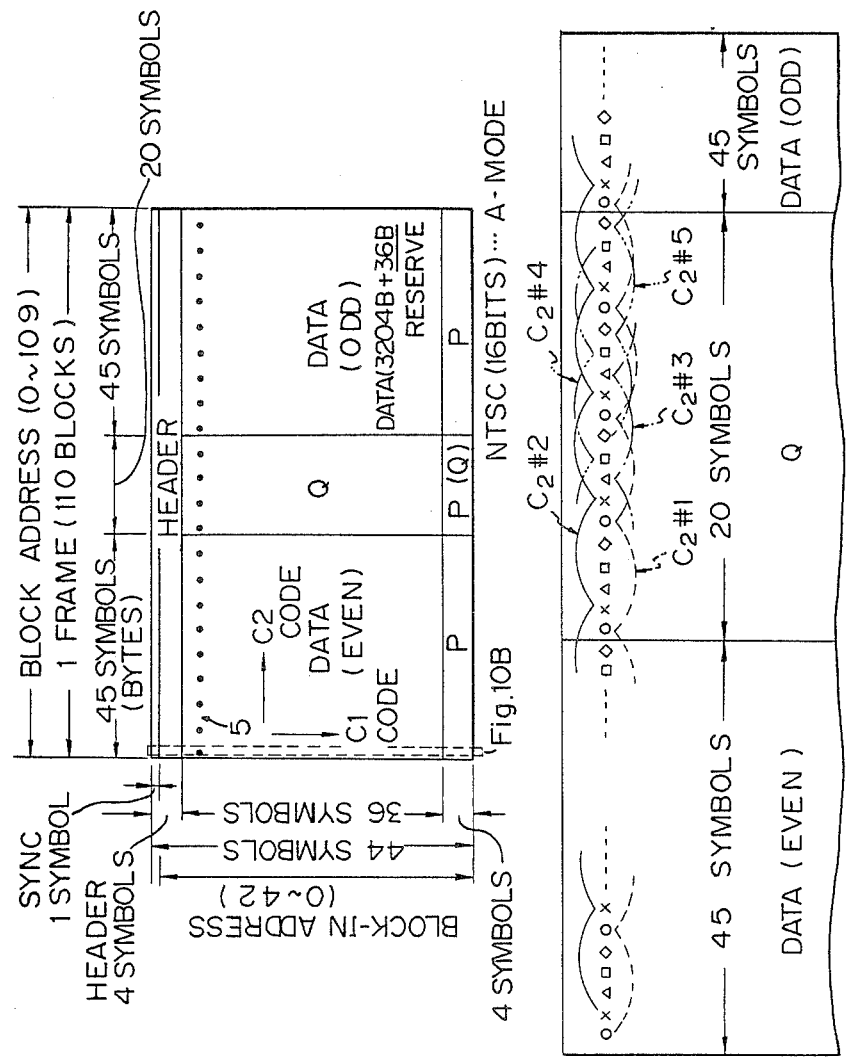
FIGS. 6A and 6B are a schematic diagram showing a block structure of the NTSC system of an A mode.
Figure 7:
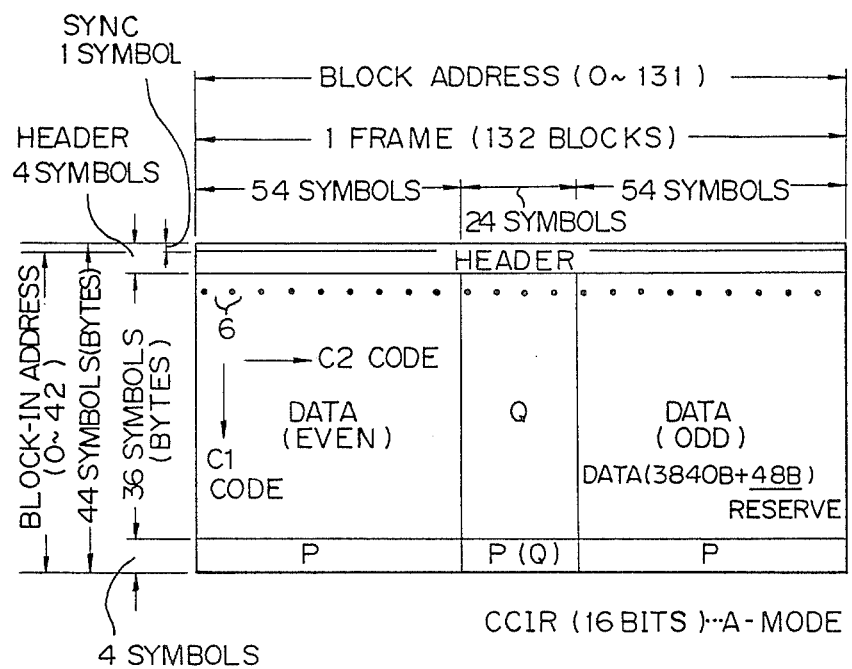
FIG. 7 is a schematic diagram showing a block structure of the CCIR system of the A mode.

FIGS. 6 and 7 show respective block structures of the NTSC system and the CCIR system in the A mode (one word has six bits). In the case of the NTSC system, as shown in FIGS. 6A and 6B, symbols of data are disposed in a matrix form of 36×90. The total number of the symbols is 3240. The number of symbols of audio data which are actually used is 3204 symbols, and the remaining 36 symbols are reserve data. For the audio data and the reserve data, a header signal of 4×110 symbols is added. In the structure shown in FIG. 1, the header signal is added at the adder 18 after the encoding of the error correction code has been performed. In this structure, the header signal is not error encoded.

However, in the block structures shown in FIGS. 6A and 6B~FIG. 9, the encoding of the C1 code is done when necessary with respect to the address signal and the various identification signals (that is, signals of block-in addresses 0~3) other than the synchronization signal (one symbol lying in the first row) of the header signal.

The encoding of the C1 code is made for every 39 symbols which are the sum of three symbols of the header signal arranged in the vertical direction and 36 symbols of data. The C1 code is a Reed-Solomon code (43, 39, 5), i.e. whose code length, information length, distance are, respectively, 43, 39, 5. A four symbol redundant code P (hereunder called "check data") of the C1 code is developed for every set of 39 symbols and is disposed at each of four rows on the lower side of the block.

The encoding of the C2 code is carried out in the horizontal direction of the block. The C2 code is a Reed-Solomon code of whose code length, information length, and distance are, respectively, 22, 18, 5. 90 symbols are contained in each row in the horizontal direction of the block. As shown in detail in FIG. 6B, four symbol check data Q of the C2 code are developed from 18 symbols of data (the number of each of O, X, Δ, □ and , is 18) selected out of every five symbol data (marked by O, X, Δ, □ and , respectively) among the 90 symbols. Since five sets (#1~#5) of the C2 codes are contained in one row, check data of the C2 codes of 4×5=20 symbols is developed.

As a result, a block of the size of 44×110 is finally provided based on the audio data, reserve data, header signal, and check data, P, Q. The above-mentioned generating method of P and Q parities is similar to the technique disclosed in detail in the U.S. Pat. No. 4,688,225 and the U.S. application Ser. No. 252,807. Recording onto magnetic tape is done by reading the data from each block sequentially (from the block address 0 toward the block address 109 for every 44 symbols arranged in the vertical direction. In each channel of audio data, words of an even number are disposed on one side of a block (on the lef-hand side in the drawing) when numbers are attached from the first word, words of an odd number are arranged on the other side of the block (on the right-hand side in the drawing), and check data of the C2 code is disposed between data of an even number and data of an odd number. This is to prevent the recording positions of audio data which is continuous in terms of time from separating on the magnetic tape to become error data.

The encoding of the C1 code is made for check data Q of the C2 code to develop check data P. The check data provided at this time is identical to check data Q provided when the encoding of the C2 code is done for check data P of the C1 code. In this meaning, P (Q) code is used in the drawings.

In the A mode of the CCIR system, the process of the encoding is done using a block structure shown in FIG. 7. In the case of the CCIR system, as shown in FIG. 7, symbols of data are arranged in a matrix fashion of 36×108. The total number of the symbols (44 symbols) in the vertical direction is equal to the block in the NTSC system shown in FIGS. 6A and 6B. The total number of the symbols becomes 3888. Audio data is 3840 symbols, and the remaining 48 symbols are reserve data. For the audio data and the reserve data, a header signal of 4×132 symbols is added.

The encoding of the C1 code is carried out for every 39 symbols, i.e. equal to the sum of three symbols of the header signal and 36 symbols of the data arranged in the vertical direction. The C1 code is a Reed-Solomon code of (43, 39, 5) similar to the NTSC system. Check data P for a four-symbol C1 code is developed for every set of 39 symbols and disposed in four rows on the lower side of the block.

The encoding of the C2 code is executed in the horizontal direction of the block. The C2 code is a Reed-Solomon code of (22, 18, 5), identical to the NTSC system. 54+54=108 symbols are contained in each row in the horizontal direction of the block.

Four symbol check data Q for the C2 code are developed from 18 symbols selected out of every six symbols among the 108 symbols. An interleave length in the horizontal direction is selected to be six symbols, which is different from the five symbols in the NTSC system. Since six sets of the C2 codes are included in one row, check data Q of the C2 code of 4×6=24 symbols is developed.

Therefore, a block having the size of 44×132 symbols is finally provided by audio data, reserve data, the header signal and check data P, Q. The recording is made in the order of every 44 symbols arranged in the vertical direction at the time of recording. The arrangement of words of an even number, words of an odd number and check data of the C2 code is similar to FIGS. 6A and 6B.

Figure 8:
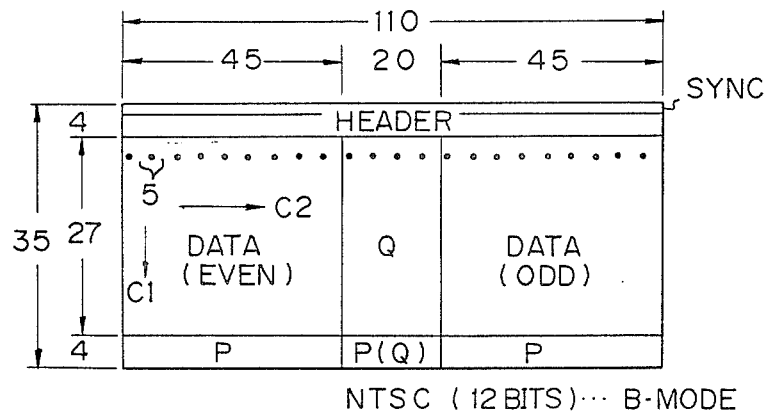
FIG. 8 is a schematic diagram showing a block structure of the CCIR system of a B mode.
Figure 9:
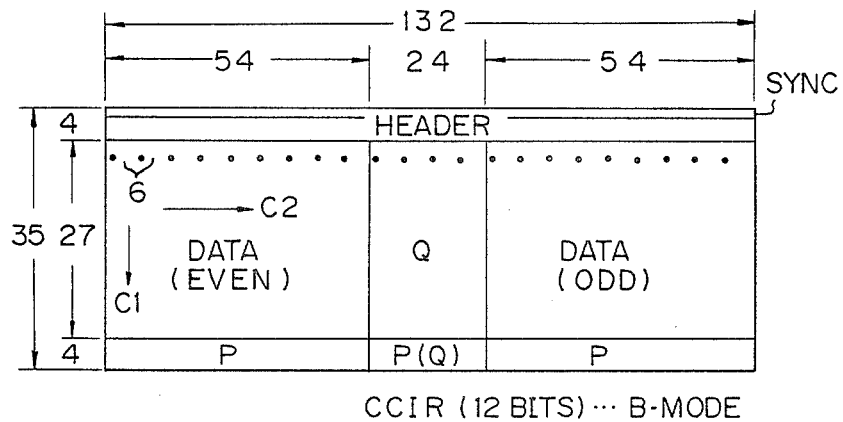
FIG. 9 is a schematic diagram of a block structure of the CCIR system of the B mode.

The block structure in which one word has 12 bits in the B mode is as shown in FIGS. 8 and 9. It is to be noted that the amount of only true data, i.e. not including dummy data, is indicated in these drawings. That is, FIGS. 8 and 9 show the block diagrams in the case where the input signal to the dummy bit insertion circuit 13 is assumed to be input to the error correction encoder 15.

As can be seen from FIG. 8, since the data amount decreases to ¾ in the B mode as compared with the A mode, the number of symbols in the vertical direction is 27 symbols and that in the horizontal direction is 110, which is identical to the A mode as shown in FIG. 6A. Similarly, as shown in FIG. 9, the number of symbols in the vertical direction is 27 in the case of the CCIR system, and the number of symbols in the horizontal direction is 132, which is identical to the A mode, as shown in FIG. 7.

Before the data is supplied to the error correction encoder 15, dummy data is added by the dummy bit insertion circuit 13 to make the number of symbols in the vertical direction 36, which is identical to the A mode in the actual block construction. As a result, the same codes can be employed for the C1 code and the C2 code between the A mode and the B mode, and the error correction encoder 15 can be used in common with the two modes, which is a main object of the present invention. Further, as mentioned above, the same C1 code and C2 code can be used in the NTSC system and CCIR system except for the size of the block and the interleave length in the horizontal direction.

Figures 10A, 10B, 10C:
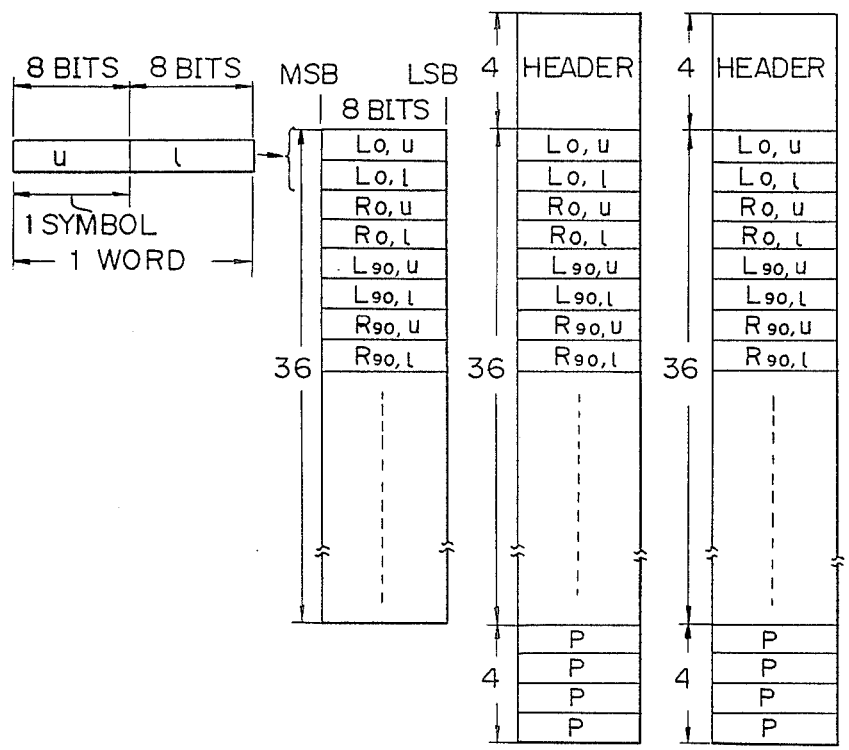
FIGS. 10A, 10B, and 10C are a schematic diagram showing a partially enlarged part of the block of the NTSC system of the A mode.

FIGS. 10A, 10B, and 10C show an enlarged part of the block in the A mode (NTSC system) shown in FIGS. 6A and 6B. Data $L_0$, $L_1$, $L_2$, ... of one channel (left-hand channel) of one-word/16-bit data and data $R_0$, $R_1$, $R_2$, ... of the other channel (right-hand channel) are divided into upper eight-bit symbols (code u is affixed) and lower eight-bit symbols (code 1 is affixed). For instance, one word $L_0$ is divided into two symbols $L_{0,u}$ and $L_{0,l}$. As shown in FIGS. 6 to 9, symbols of words of an even number are disposed on the left-hand side of the block and in the horizontal direction from the left end, and symbols of words of an odd number are disposed on the right-hand side of the block and in the horizontal direction from the right end. As a result, symbols indicated in FIG. 10A are arranged in the most left-hand side column of the block.

A header signal (strictly speaking, a synchronization signal is excluded) is added and supplied to the error correction encoder, and check data P of the C1 code and check data Q (not shown) of the C2 code are added. Data indicated in FIG. 10C similar to FIG. 10B is recorded onto a magnetic tape.

c. Addition of dummy data.

Figure 11:
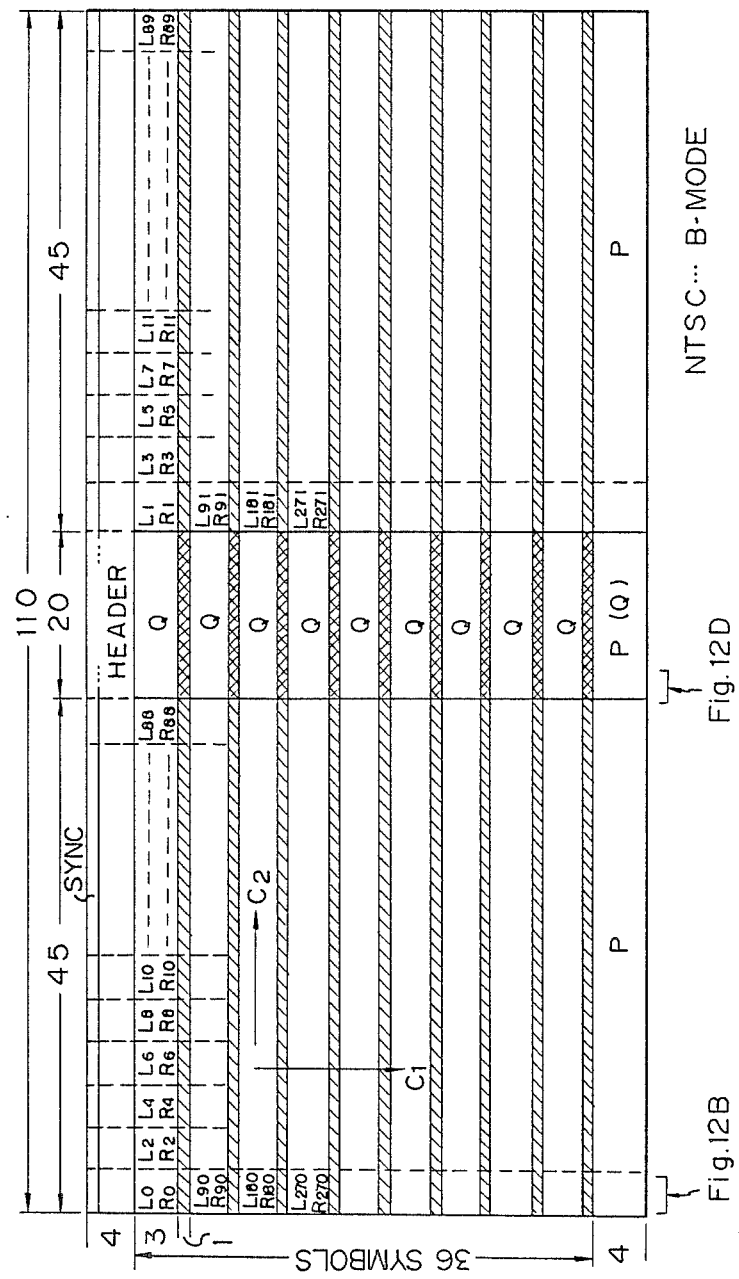
FIG. 11 is a schematic diagram of a block structure in a state in which dummy data is added in the NTSC system of the B mode.

For a block of data in the B mode (12 bits) (NTSC system) shown in FIG. 8, dummy data is added to construct a block shown in FIG. 11. In FIG. 11, data shaded by oblique lines is the dummy data (zero data). In this example, dummy data of one symbol is added on the lower side of a header signal for three symbols in the vertical direction. With this processing, the size of the block becomes equal to that in the A mode. Since the dummy data is arranged in the horizontal direction, a part of check data Q of the C2 code is developed from only dummy data. The check data that is developed from only the dummy data is indicated by a cross hatching in FIG. 11.

After the encoding by the C2 code and the C1 code, data is transmitted from which the dummy data, indicated by the oblique line, and the check data of the C2 code developed from the dummy data, indicated by the cross hatching, are excluded. As a result, the data amount to be transmitted is reduced to lower the data rate.

FIGS. 12A, 12B, 12C, 12D, and 12E are for explaining the addition of dummy data. FIG. 12A shows a state in which one-word of 12-bit data has been converted into symbols each having an eight bit length. The upper eight bits of the twelve bits are selected to be an upper-side symbol (u code is attached), and the lower four bits are assigned a lower-side symbol (1 code is attached). With such word to symbol conversion, a four-bit vacancy occurs on the right-hand side of the lower symbol.

The lower four bits of another word are inserted into the vacancy, and dummy data (8 bits) are inserted into the eight-bit vacancy occurring in the position previously occupied in part by the moved lower four bits. For example, as indicated by an arrow, a symbol $R_{0,l}$ is disposed in a vacancy occurring on the right-hand side of a symbol $L_{0,l}$, and dummy data is inserted into the place where the symbol $R_{0,l}$ had been positioned. Therefore, in FIG. 12B, as shown by an oblique line, one-symbol of dummy data is added after each group of three symbols of real data when one column in the block is viewed. Since dummy data is inserted into all columns in this manner, the dummy data is consequently arranged in the horizontal direction. In this way, the encoding of the C2 code and the C1 code is performed in the state where dummy data is added.

The dummy data is excluded at the dummy bit elimination circuit 16 after the encoding, and data from which the dummy data has been eliminated is recorded onto a magnetic tape. Since the dummy data is arranged as stated above, redundant check data (i.e., zero data) of the C2 code developed from the dummy data as indicated by a cross hatching in FIG. 12D occurs at three symbol intervals even in the set of check data of the C2 code. The check data developed only from the dummy data is eliminated, and check data Q shown in FIG. 12E is transmitted and recorded onto a magnetic tape.

Actually, dummy data is added by first writing zero data into a memory of an error correction encoder in advance and then writing symbols so as to provide the array indicated in FIG. 12B.

d. Modification.

Figures 13A, 13B:
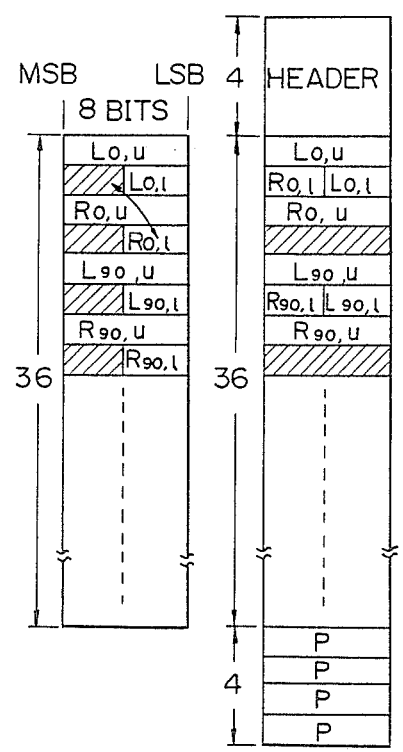
FIGS. 13A and 13B are a schematic diagram for describing another example of the dummy data addition.

As shown in FIG. 13A, by providing a vacant portion on the left-hand side of the lower-four-bit symbol, dummy data can be added.

Figure 14:
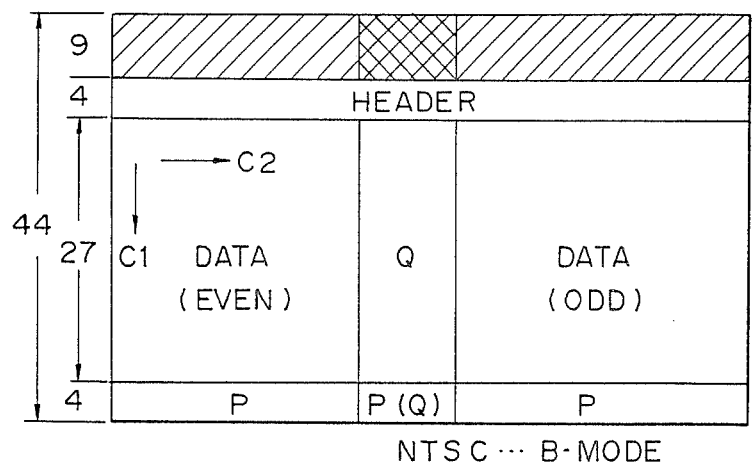
FIG. 14 is still another example of the dummy data addition.

In addition, as shown in FIG. 14, a lump of dummy data, indicated by the oblique line shading in the figure, can be added on the upper side of the data block shown in FIG. 8.

Further, processing similar to the above-mentioned addition of dummy data in the NTSC system is applicable to the CCIR system.

According to the foregoing embodiment, the sizes of the blocks between the A mode and the B mode can be kept # equal. The invention is applicable to the case where the sizes of the blocks are kept equal in the NTSC system and the CCIR system in the same mode.

For example, in the case of the A mode, the sizes in the horizontal direction (NTSC system: 110, CCIR system: 132) between the NTSC system and the CCIR system are different, as seen from FIGS. 6 and 7. By adding dummy data to the block in the NTSC system, a block of the same size as in the CCIR system can be constructed.

Figure 15:
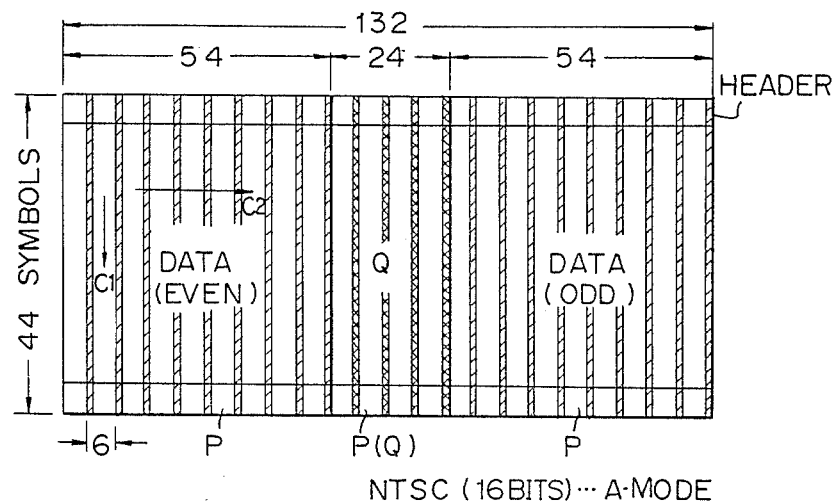
FIG. 15 is a schematic diagram for describing yet another example of the dummy data addition.

FIG. 15 shows one example to attain this object. In FIG. 15, as shown by the oblique lines, one-symbol of dummy data is added at intervals of five symbols with respect to the block shown in FIGS. 6A and 6B in the NTSC system so that the data is arranged in the vertical direction. The interleave length of the C2 code in the horizontal direction is selected to be 6, and, therefore, check data Q of the C2 code consisting of only the dummy data is developed. Additionally, check data P of the C1 code is developed from dummy data arranged in the vertical direction. At the time of transmission, these dummy data and check data P, Q of the C1 code and the C2 code are eliminated. Also, when consideration is paid only to the C1 code, the dummy data can be arranged in a lump on the left-hand side or on the right-hand side of the block.

Further, although not shown, both of the abovementioned furst embodiment (the system in which the sizes of the blocks are kept equal between the A mode and the B mode) and the second embodiment (the system in which the sizes of the blocks are kept equal in the NTSC system and the CCIR system) can be combined.

Clearly, dummy data is to be added to the smaller data block so that its size is matched to the largest block among the four combinations (FIGS. 6A and 6B ~ FIG. 9) and the dummy data is arranged in the horizontal direction or in the vertical direction. With such an arrangement, the block size is unified, and the interleave length of the C2 code in the horizontal direction is unified.

As dummy data, predetermined data (all "1" data or other data having a particular bit pattern) can be employed without being limited to zero data.

In this invention, by adding dummy data, the sizes of the blocks of error correction codes become equal, despite the difference of the bit numbers of words and the difference of television systems, and each of the encoder and the decoder for the error correction coding and decoding can be the same for the different modes and between different television systems. As a result, the size of the required hardware is small. Also, in the invention, when dummy data is added, a part of the error correction code check data is composed of only dummy data. For this reason, not only the transmission of dummy data but also the transmission of a part of the check data can be omitted to lower the data amount for transmission. Consequently, the rate of transmission of the data can be reduced.

Although the present invention has been shown and described with respect to preferred embodiments, various changes and modifications which are obvious to a person skilled in the art to which the invention pertains are deemed to lie within the spirit and scope of the invention.

What is claimed is:

1. A data transmission method for error correction encoding data in units of a block composed of a two-dimensional array of digital information signals, comprising the steps of:

making equal the size of a first block and the size of a second block, whose block sizes are different, by adding dummy data to whichever of the first and second blocks has the lesser amount of data;

error correction encoding the one block that has the dummy data and the other block that does not contain dummy data, so that at least a part of a sequence of the error correction code in the block containing the lesser amount of data is developed only from the dummy data and is therefore redundant code; and eliminating the dummy data and the redundant code from the error correction encoded blocks to produce output data and transmitting the output data.

2. A data transmission method for error correction encoding a data block, which is composed of a two-dimensional array of digital information signals, with a first error correction code (C1 code) encoding data in the vertical direction of the array, and a second error correction code (C2 code) encoding data in the horizontal direction of the array, comprising the steps of:

making equal the size of a first block and the size of a second block, whose block sizes are different, by adding dummy data to whichever of the blocks has the lesser amount of data, the dummy data being added so that it is arranged in the horizontal direction within the block;

error correction encoding with the first and second error correction codes the block containing the added dummy data and the other block that does not contain added dummy data, wherein from the second error correction code and only dummy data a redundant code is formed; and eliminating from the error correction encoded data the dummy data and the redundant code to produce output data and transmitting the output data.

3. A data transmission method as claimed in claim 1 or claim 2, wherein the first and second blocks are composed of digital information signals digitized at the same sampling frequency and the first block is composed of m bits per unit and the second block is composed of n bits (m>n) per unit, where m and n are integers, and the dummy data is composed of m−n bit or bits.

4. A data transmission method as claimed in claim 3, wherein m=8 bits and n=6 bits in the use of a symbol as one unit, m=16 bits, n=12 bits is maintained in the use of a word as one unit, and m=32 bits, n=24 bits is established in the use of two-channel data as one unit.

5. A data transmission method as claimed in claim 4, wherein when one-word/12-bit data is divided into an eight-bit symbol, one symbol is formed by the upper eight bits of one word, another symbol is formed by the lower four bits of the word and the lower four bits of another word, and eight bits of dummy data are added following every three symbols.

6. A data transmission method for error correction encoding a data block composed of a two-dimensional array of digital information signals, with a first error correction code (C1 code) encoding data in the vertical direction of the array, and a second error correction code (C2 code) encoding data in the horizontal or oblique direction of the array, comprising the steps of:
   making equal the size of a first block and the size of a second block whose block sizes are different by adding dummy data to whichever block has the lesser amount of data, the dummy data being added so that it is arranged in the vertical direction within the block;
   selectively error correction encoding the block containing the added dummy data and the other block that does not contain any added dummy data using the first and second error correction codes thereby forming a redundant code from only dummy data which is error correction encoded using the C1 code; and
   eliminating from the error correction encoded data the dummy data and the redundant code to produce output data and transmitting the output data.

7. A data transmission method as claimed in claim 6, wherein the first block is composed of an audio signal contained in a constant period of a television signal in the NTSC system which is digitized to form a digital audio signal and the second block is composed of an audio signal contained in a constant period of a television signal in the CCIR system which is digitized to form a digital audio signal.

8. A data transmission method for error correction encoding a data block composed of a two-dimensional array of digital information signals, with a first error correction code (C1 code) encoding data in the vertical direction of the array and a second error correction code (C2 code) encoding data in the horizontal direction of the array, comprising the steps of:
   making equal the size of a first block and the size of a second block whose block sizes are different by adding first and second dummy data to whichever of the blocks has the lesser amount of data, the first dummy data being added so that it is arranged in the vertical direction within the block and the second dummy data being added so that it is arranged in the horizontal direction within the block;
   using the first and second error correction codes, error correction encoding the block containing the added first and second dummy data and the other block which does not contain the first and second dummy data thereby forming redundant codes from only dummy data which is error correction encoded using the C1 code or the C2 code; and
   eliminating from the error correction encoded data the first and second dummy data and the redundant codes to produce output data and transmitting the output data.

9. A data transmission apparatus of the type which includes an encoder for error correction encoding data in units of a block composed of a two-dimensional array of digital information signals, comprising:
   means for equalizing the size of a first block and the size of a second block, whose block sizes are different, by adding dummy data to whichever of the blocks has the lesser amount of data, i.e. the smaller block;
   means for selectively supplying the one block that has the dummy data and the other block that does not contain dummy data to the encoder for encoding so that at least a part of a sequence of the error correction code in the block containing the lesser amount of data is developed only from the dummy data and is therefore redundant code; and
   means for eliminating the dummy data and the redundant code from the error correction encoded blocks to produce output data and transmitting the output data.

10. A data transmission apparatus of the type having an encoder for error correction encoding a data block composed of a two-dimensional array of digital information signals, by means of a first error correction code (C1 code) in the vertical direction of the array and a second error correction code (C2 code) in the horizontal direction of the array, comprising:
   means for equalizing the size of a first block and the size of a second block whose block sizes are different by adding dummy data to whichever of the blocks has the lesser amount of data the dummy data being added so that it is arranged in the horizontal direction within the block;
   means for selectively supplying the block containing the added dummy data and the other block that does not contain added dummy data to the encoder for encoding so that at least a part of a sequence of the error correction code in the block containing the lesser amount of data is developed only from the dummy data and is therefore redundant code; and
   elimination means supplied with output signal of the encoder for eliminating therefrom the dummy data and the redundant code to produce an output code and transmitting the output data.

11. A data transmission apparatus as claimed in claim 9 or claim 10, wherein the first and second blocks are composed of digital information signals digitized at the same sampling frequency, the first block having m bits/unit and the second block having n bits/unit (m>n), where m and n are integers, and the means for adding dummy data adds m−n bit or bits.

12. A data transmission method as claimed in claim 11, wherein m=8 bits, n=6 bits is established in the use of a symbol as one unit, m=16 bits, n=12 bits is maintained in the use of a word as one unit, and m=32 bits, n=24 bits is established in the use of two-channel data as one unit.

13. A data transmission apparatus as claimed in claim 11, wherein the means for adding dummy data includes a front stage for compressing m bits of data to n bits of data.

14. A data transmission apparatus as claimed in claim 11, wherein the encoder includes a front stage further comprising a word/symbol data converter for dividing each data unit into upper symbol bit data and lower symbol bit data.

15. A data transmission apparatus as claimed in claim 14, wherein the means for eliminating the dummy data and the redundant code includes a post stage further comprising a bit number conversion circuit for modifying the bit pattern of the symbol bit data and reducing the DC component thereof.

16. An apparatus for recording PCM audio signals onto a magnetic tape by magnetic heads and which s capable of selecting between a first mode in which one unit of digital data is composed of m bits and a second mode in which one unit of digital data is composed of n bits (m>n), where m and n are integers, the data of both modes having the same sampling frequency, comprising:
    (a) error correction encoding means commonly used for the first and second modes for encoding the data in units of blocks composed of a two-dimensional array of the digital data;
    (b) first insertion means for inserting m−n bits of dummy data into the units of data prior to error correction encoding by the error correction encoding means so that a redundant error correction code made up from only dummy bits is produced;
    (c) first elimination means for eliminating the inserted m−n dummy bits from the data; and
    (d) addition means for adding an information header, including at least a block synchronization signal, to the data,
    wherein in the first mode, data units composed of m bits each are encoded by the error correction encoding means, the addition means adds a first block synchronization signal to each block of the encoding-processed data, and data from the addition means is transmitted, and
    in the second mode, the first insertion means inserts dummy bits into each data unit composed of n bits so as to transform it into one unit of m-bit data which is supplied to the error correction encoding means where it is encoded, the first elimination means eliminates the inserted bits and the redundant code from the error correction encoded data so as to output units of n bit data, these units of n bit data from the first elimination means are supplied to the addition means which adds a second block synchronization signal to each block to thereby produce output data and the output data from the addition means is transmitted to the magnetic heads and is magnetically recorded on the magnetic tape.

17. A data transmission apparatus according to claim 16, wherein the first insertion means further comprises means for compressing m bits of data to n bits of data.

18. A data transmission apparatus according to claim 16, wherein the error correction encoding means further comprises a word/symbol data converter for dividing the unit data into upper symbol bit data and lower symbol bit data.

19. A data transmission apparatus according to claim 18, wherein the addition means further comprises a bit number conversion circuit for modifying the bit pattern of the symbol bit data and reducing the direct current (DC) component thereof.

20. A data transmission apparatus according to claim 19, wherein the first insertion means adds the dummy data as the upper bits of the unit data.

21. A data transmission apparatus according to claim 19, wherein the first insertion means adds the dummy data as the upper bits and the lower bits to each data unit.

22. A data transmission apparatus according to claim 16, wherein the addition means for adding an information header also adds to the data a mode identification signal indicating whether the first mode is selected or the second mode is selected.

23. An apparatus as claimed in claim 19, wherein the first mode is selected when metal evaporated type is used and the second mode is selected when metal powder tape is used.

* * * * *